United States Patent
Swaminathan et al.

(10) Patent No.: US 9,043,409 B2
(45) Date of Patent: May 26, 2015

(54) METHODS AND APPARATUS FOR A PLUG-IN MODEL FOR PUBLISHING STRUCTURED META-DATA BASED DISCOVERY

(75) Inventors: Ashwin Swaminathan, San Diego, CA (US); Ranjith Subramanian Jayaram, Bridgewater, NJ (US); Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 993 days.

(21) Appl. No.: 12/797,940

(22) Filed: Jun. 10, 2010

(65) Prior Publication Data

US 2011/0072055 A1 Mar. 24, 2011

Related U.S. Application Data

(60) Provisional application No. 61/186,319, filed on Jun. 11, 2009.

(51) Int. Cl.
*G06F 15/16* (2006.01)
*H04L 29/08* (2006.01)

(52) U.S. Cl.
CPC ......... *H04L 67/16* (2013.01); *Y10S 707/99936* (2013.01)

(58) Field of Classification Search
USPC ............ 709/206, 224, 225, 226; 707/999.006
See application file for complete search history.

(56) References Cited

U.S. PATENT DOCUMENTS

| | | | |
|---|---|---|---|
| 6,256,623 B1 | 7/2001 | Jones | |
| 7,007,014 B2 | 2/2006 | Liu et al. | |
| 7,523,105 B2 | 4/2009 | Wen et al. | |
| 7,656,822 B1* | 2/2010 | AbdelAziz et al. | 370/255 |
| 8,185,536 B2* | 5/2012 | Basu et al. | 707/749 |
| 8,255,405 B2* | 8/2012 | Basu et al. | 707/749 |
| 2002/0052966 A1* | 5/2002 | Isomura et al. | 709/230 |
| 2003/0172127 A1* | 9/2003 | Northrup et al. | 709/219 |
| 2004/0122812 A1 | 6/2004 | Yoshimura et al. | |

(Continued)

FOREIGN PATENT DOCUMENTS

| | | |
|---|---|---|
| CN | 1481115 A | 3/2004 |
| CN | 1193331 C | 3/2005 |

(Continued)

OTHER PUBLICATIONS

International Search Report and Written Opinion—PCT/US2010/038440, International Searching Authority—European Patent Office, Nov. 4, 2010.

(Continued)

*Primary Examiner* — Thanh Tammy Nguyen
*Assistant Examiner* — Jonathan Bui
(74) *Attorney, Agent, or Firm* — Kristine U. Ekwueme

(57) ABSTRACT

Methods and apparatus for publishing services and performing queries for service in a network are described herein. Service descriptions writing in a native search description language are translated to a normalized schema. The normal schema is published to the network. Queries to the network, which may be written in any native search description language, are also translated to normalized schema prior to performing the search. Accordingly, all services available can be published and located in a query without consideration of the native search description language.

27 Claims, 8 Drawing Sheets

(56) References Cited

U.S. PATENT DOCUMENTS

| | | | |
|---|---|---|---|
| 2005/0097087 A1* | 5/2005 | Punaganti Venkata et al. | 707/3 |
| 2006/0161655 A1* | 7/2006 | Altenhofen et al. | 709/224 |
| 2006/0277189 A1* | 12/2006 | Cencini | 707/10 |
| 2007/0288431 A1* | 12/2007 | Reitter et al. | 707/3 |
| 2008/0086490 A1* | 4/2008 | Paliwal et al. | 707/101 |
| 2008/0244514 A1* | 10/2008 | Hilerio et al. | 717/115 |
| 2009/0006311 A1 | 1/2009 | Ting et al. | |
| 2009/0063462 A1 | 3/2009 | Alfonseca et al. | |
| 2009/0125503 A1 | 5/2009 | He | |
| 2009/0204612 A1* | 8/2009 | Keshavarz-Nia et al. | 707/6 |
| 2009/0303926 A1* | 12/2009 | Den Hartog et al. | 370/328 |
| 2010/0010974 A1* | 1/2010 | Chieu et al. | 707/4 |
| 2010/0198839 A1* | 8/2010 | Basu et al. | 707/749 |
| 2010/0250515 A1* | 9/2010 | Ozonat et al. | 707/709 |
| 2011/0182205 A1* | 7/2011 | Gerdes et al. | 370/254 |

FOREIGN PATENT DOCUMENTS

| | | |
|---|---|---|
| CN | 1788258 A | 6/2006 |
| CN | 101237457 A | 8/2008 |
| CN | 100418088 C | 9/2008 |
| CN | 100456286 C | 1/2009 |
| EP | 1835417 A1 * | 9/2007 |
| JP | 2002196990 A | 7/2002 |
| JP | 2002215486 A | 8/2002 |
| JP | 2003304523 A | 10/2003 |
| JP | 2004199515 A | 7/2004 |
| JP | 2007072654 A | 3/2007 |
| JP | 2007234050 A | 9/2007 |
| TW | I224742 B | 12/2004 |
| TW | I251442 B | 3/2006 |
| TW | I280488 B | 5/2007 |
| TW | 200822728 A | 5/2008 |
| WO | 2004023341 A1 | 3/2004 |
| WO | WO2004059502 A1 | 7/2004 |
| WO | WO2006127197 A2 | 11/2006 |
| WO | WO2007005131 A2 | 1/2007 |
| WO | WO2007139288 | 6/2007 |

OTHER PUBLICATIONS

Taiwan Search Report—TW099119174—TIPO—Jul. 16, 2013.

* cited by examiner

```
702   <gss>
        <required>
            <servicename>                </servicename>
            < servicedescriptionlanguage >        </servicedescriptionlanguage >
            <textdescription>            </textdescription>
            <contactInformation>
                <weburi>                 </weburi>
                <contactNode nodeID = nodeIdentifier/>
            </contactInformation>
            <searchKeywords>
                <userDefinedKeyword>     </userDefinedKeyword>
                <userDefinedKeyword>     </userDefinedKeyword>
            </searchKeywords>
            ...
        </required>

704   <optional>
            <hasInput>                   </hasInput>
            <hasOutput>                  </hasOutput>
            <hasPrecondition>            </hasPrecondition>
            <hasResult>                  </hasResult>
            <contactInformation>
                <weburi>                 </weburi>
                <contactNode nodeID = nodeIdentifier>
                    <nodeRating>         </nodeRating>
                    <location>           </location>
                </contactNode>
            </contactInformation>
            <servicePublisher>           </servicePublisher>

<searchKeywords>
                <userDefinedKeyword>     </userDefinedKeyword>
            </searchKeywords>
            ...
        </optional>
```

```
<publishWithKeywords>
        <!---Information about the first keyword -->
        <keywordSpecificInfo name="keywordname1">
                <numberOfOccurrences>        </numberOfOccurrences>
        </keywordSpecificInfo>
        <!---Information about the second keyword -->
        <keywordSpecificInfo name="keywordname2">
                <numberOfOccurrences>        </numberOfOccurrences>
        </keywordSpecificInfo>

<serviceSpecificInfo>
                <serviceReputation>        </serviceRepuation>
                <contactInformation>
                        <weburi>        </weburi>
                        <contactNode nodeID = nodeIdentifier>
                                <nodeRating>        </nodeRating>
                                <location>        </location>
                        </contactNode>
                </contactInformation>
        </serviceSpecificInfo>
        ...
</publishWithKeywords>
</gss>
```

```
<gss>
    <required>
        <servicedescriptionlanguage>upnp</servicedescriptionlanguage>
        <contactInformation>
            <weburi>location of the service description</weburi>
        </contactInformation>
        <searchKeywords>
            <NT> (search target) </NT>
            <host>(HostAddress):(ServicePort)</host>
            <USN> (unique serial number) </USN>
        </searchKeywords>
    </required>
</gss>
```

FIG. 8

METHODS AND APPARATUS FOR A PLUG-IN MODEL FOR PUBLISHING STRUCTURED META-DATA BASED DISCOVERY

CLAIM OF PRIORITY UNDER 35 U.S.C. §119

The present Application for patent claims priority to Provisional Application No. 61/186,319 entitled "METHODS AND APPARATUS FOR A PLUG-IN MODEL FOR PUBLISHING STRUCTURED DATA IN A DISTRIBUTED NETWORK" filed Jun. 11, 2009 assigned to the assignee hereof and hereby expressly incorporated by reference herein.

BACKGROUND

1. Field

The present disclosure relates to a mobile operating environment, and more particularly, to overlay networks and methods and apparatus for publishing data structures therein.

2. Background

An overlay network is a virtual network of nodes and logical links that is built on top of an existing network. Examples of an overlay network include, but are not limited to, the Internet, Chord, Content Addressable Network (CAN), Pastry, and Viceroy. In some overlay networks, each node can store a portion of overlay network data, called a partition, so as to distribute the data across the network to increase network efficiency in storage and retrieval of the data.

A device or node that joins an overlay network may desire to obtain a service from another device or node in the overlay network. Such services are published in the overlay network using any one of a plurality of service description languages, each having a corresponding service discovery protocol for use to find the published service. A definition of service discovery as given by Wikipedia states: "[s]ervice discovery protocols are network protocols which allow automatic detection of devices and services offered by these devices on a computer network." In other words, service discovery is the action of finding a service provider for a requested service. When the location of the demanded service (typically the address of the service provider) is retrieved, the user may further access and use it.

In general, service discovery protocols include two entities: (a) the service provider—who provides the service on the overlay, and (b) the client—who uses the service. In one aspect, examples of a service provider include nodes which provide services such as printing, scanning, faxing, storage, music share, file share, games, and web services such as for booking movie tickets, hotels, air tickets, or online gaming, etc. Further, any node in the network can act as a client. Thus, the goal of service discovery is to help the client find a service provider for a particular service of interest (if such a service exists).

For service discovery to be successful in a peer-to-peer overlay network, the service provider should specify its service(s) using a service description language, metadata about the service should be stored in some searchable form on nodes in the overlay, and clients should be able to express the service requests using searchable keywords that are passed on to the querying system to help find the corresponding services.

In the prior art, however, a problem for finding all available services arises because of the use of different protocols. As noted above, services are usually described via a service description language, and this language is used both for publishing the service and for discovering the service in the overlay. However, there are several service description languages that are standardized, widely popular, and widely deployed for describing different kinds of services. Some examples include OWL-S, UDDI, UPnP, WSDL, XML, RDF, etc. Each of these languages has their own domain of popularity and there is no clear winner. Accordingly, as different languages are used by different services, a client can only recognize those services described using the same language as the query of the client. In the prior art, there is a loose coupling between the discovery protocol and the service description languages. For example, UPnP uses its own service description language, UDDI uses WSDL for web services, and so on. Thus, many available services will not be recognized.

Previous attempts to address the problem of handling multiple service languages have involved the use of translators to convert service descriptions published in one service description language into another which could eventually be published in the overlay. However, such approaches are cumbersome and given N different service description languages, where N is a positive integer, one would require at least O(N) translators to be implemented in each node, wherein O is some function.

Thus, it would be desirable to have a method of handling multiple service languages that allows efficient publication of service descriptions and efficient query processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one aspect, a method of publishing or discovering services in a network comprises receiving a native service description of a service in a first service description language for publication in a network; extracting one or more keywords from the native service description, wherein each keyword corresponds to information required for service discovery on the network; extracting one or more additional information from the native service description corresponding to each of the one or more extracted keywords; generating a searchable service description according to a normalized schema having a required field and a publish with keyword field, wherein the required field comprises each keyword extracted from the native service description, wherein the publish with keyword field comprises the extracted additional information corresponding to each extracted keyword; and publishing the overlay searchable service description to the network to advertise the service.

Yet another aspect relates to at least one processor configured to configured to publish or discover services in a network comprises a first module for receiving a native service description of a service in a first service description language for publication in a network; a second module for extracting one or more keywords from the native service description, wherein each keyword corresponds to information required for service discovery on the network; a third module for extracting one or more additional information from the native service description corresponding to each of the one or more extracted keywords; a fourth module for generating a searchable service description according to a normalized schema having a required field and a publish with keyword field, wherein the required field comprises each keyword extracted from the native service description, wherein the publish with keyword field comprises the extracted additional information corresponding to each extracted keyword; and a fifth module for publishing the searchable service description to the network to advertise the service.

Still another aspect relates to a computer program product comprises a computer-readable medium comprising a first set of codes for causing a computer to receive a native service description of a service in a first service description language for publication in a network; a second set of codes for causing the computer to extract one or more keywords from the native service description, wherein each keyword corresponds to information required for service discovery on the network; a third set of codes for causing the computer to extract one or more additional information from the native service description corresponding to each of the one or more extracted keywords; a fourth set of codes for causing the computer to generate a searchable service description according to a normalized schema having a required field and a publish with keyword field, wherein the required field comprises each keyword extracted from the native service description, wherein the publish with keyword field comprises the extracted additional information corresponding to each extracted keyword; and a fifth set of codes for causing the computer to publish the searchable service description to the network to advertise the service Yet another aspect relates to an apparatus comprising means for receiving a native service description of a service in a first service description language for publication in a network; means for extracting one or more keywords from the native service description, wherein each keyword corresponds to information required for service discovery on the network; means for extracting one or more additional information from the native service description corresponding to each of the one or more extracted keywords; means for generating a searchable service description according to a normalized schema having a required field and a publish with keyword field, wherein the required field comprises each keyword extracted from the native service description, wherein the publish with keyword field comprises the extracted additional information corresponding to each extracted keyword; and means for publishing the searchable service description to the network to advertise the service Another aspect relates to an apparatus for publishing services in a network comprising a receiver configured to receive a native service description of a service in a first service description language for publication in a network; a searchable schema plug-in component configured to extract one or more keywords from the native service description, wherein each keyword corresponds to information required for service discovery on the network; to extract one or more additional information from the native service description corresponding to each of the one or more extracted keywords; and to generate a searchable service description according to a normalized schema having a required field and a publish with keyword field, wherein the required field comprises each keyword extracted from the native service description, and wherein the publish with keyword field comprises the extracted additional information corresponding to each extracted keyword; and a publishing processing component configured to publish the searchable service description to the overlay network to advertise the service.

According to another aspect, a method for processing a network search query comprises receiving a native service query in a native service description language; translating the native service query into a searchable query according to the normalized schema; search a network for services identified by the native search query, the search being performed according to the normalized schema; and translate search results from the normalized schema to the native search description language.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 7 is an example of a normalized schema; and

FIG. 8 is another example of a normalized schema.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Networks, such as peer-to-peer networks rely on the ability to discover devices and services offered by those devices on a computer network. Various service description language schemas may be used to describe a service. The systems and methods described herein provide a common framework for publishing and discovering services. Services may be published and discovered irrespective of the service description language used to describe the service.

Figure 1:
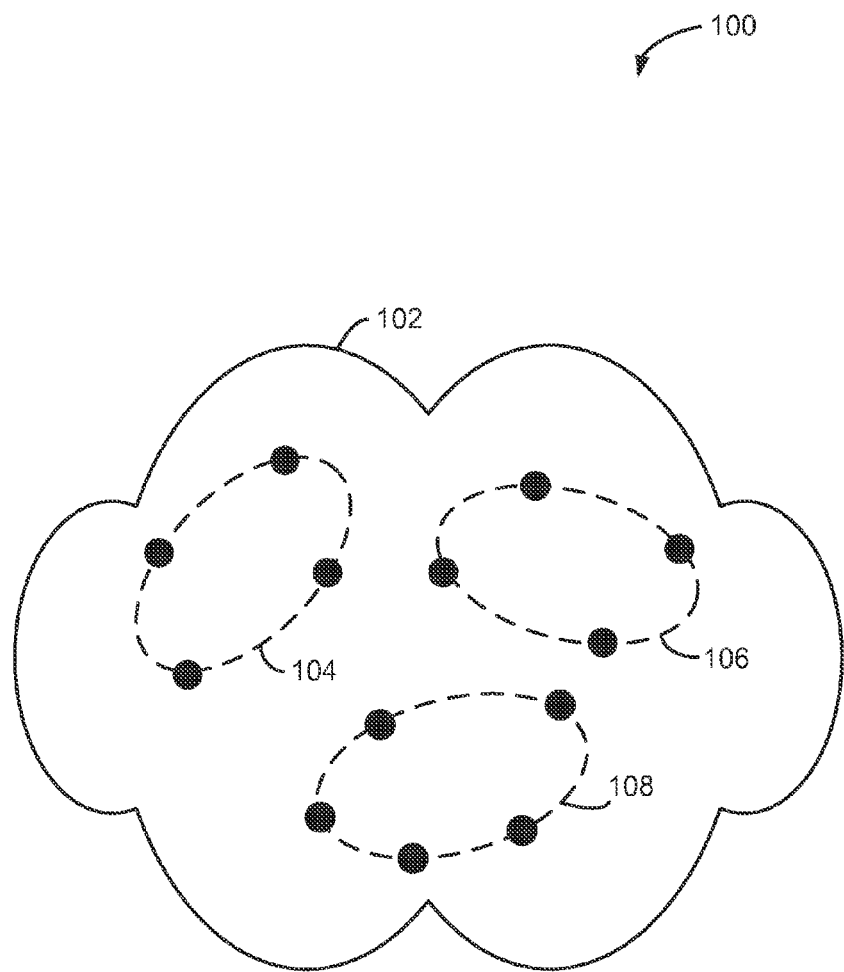
FIG. 1 is a block diagram of an aspect of a peer-to-peer network.

With reference to FIG. 1, a block diagram of a peer-to-peer overlay network 100 is provided. The network 100 comprises an underlying network 102 that comprises any type of network, such as an Internet Protocol network. Although the underlying network 102 is shown as a single entity, the underlying network may comprise any number or types of networks such as WANs, LANs, wireless networks, or any other type of network. While FIG. 1 depicts a peer-to-peer overlay network, the present application is not limited to overlay networks. The systems and methods described herein are equally applicable to any type of network, including a centralized network. For example, the network 100 may include a server that provides discovery services. In such a case, the server may act as a directory that hosts information relevant for discovery. For example, the server may host keywords and corresponding information that are published by the nodes in the network. The nodes may publish the information to the server, and queries may also be sent to the server.

In an aspect, the underlying network 102 comprises multiple peer-to-peer networks (104, 106, and 108). The peer-to-peer networks 104, 106, and 108 each comprise a subset of nodes of the underlying network 102, and operate utilizing the services of the underlying network 102 to allow those nodes to communicate. For example, in the peer-to-peer networks 104, 106, and 108, the nodes are connected by communication links provided by the underlying network 102 to form desired routing paths. The peer-to-peer networks 104, 106, and 106 may have any topology or architecture to enable any routing configuration, and are not limited to the configurations shown in FIG. 1.

Within a peer-to-peer overlay network, such as networks 104, 106, and 108, each node can operate as a service provider and/or as a client. That is, the node may provide services to the overlay, and may use services of one or more other nodes. Such services may include, for example, printing, scanning, faxing, storage, music share, file share, games, and web services such as booking movie tickets, hotels, air tickets, or online gaming. It is noted, however, that these examples of services are non-limiting, and the actual services may include more or less services than those listed. Each node may comprise a computing device such as, for example, a personal computer, a laptop computer, a wireless communications device, a mobile telephone, a personal digital assistant, a printer, a fax machine, and/or any other network-connectable computing device.

A service discovery protocol may be used to assist a node acting as a client in finding a service provider for a particular service of interest. A service provider specifies its services using a service description language such as, for example, eXtensible Markup Language (XML), Research Description Format (RDF), RDF-S, Web Service Description Language (WSDL), WSDL-S, Ontology Web Language (OWL), Ontology Web Language for Services (OWL-S), Universal Description Discovery and Integration (UDDI), Universal Plug and Play (UPnP), and/or other service description languages. Metadata about the services is stored in a searchable format on the nodes in the overlay, and clients may express a service request using searchable keywords that are passed on to a querying system to help find the corresponding services.

Figure 2:
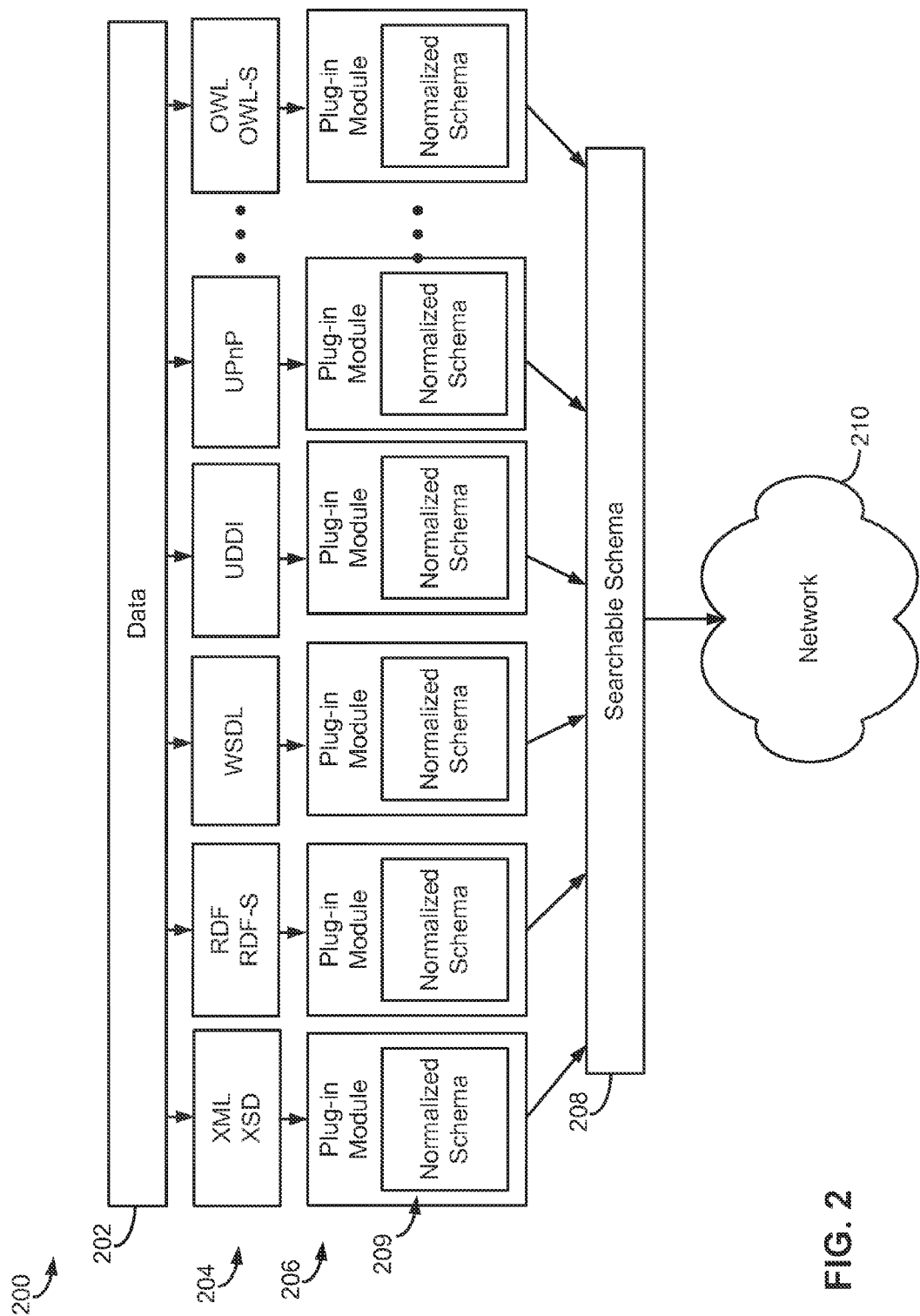
FIG. 2 is a schematic diagram of an aspect of a system for service publication, which supports the various different service description languages, in a network.

FIG. 2 depicts an exemplary system 200 for service publication, which supports the various different service description languages. System 200 provides a common framework for services to advertise and be discovered on a peer-to-peer network. As shown in FIG. 2, data 202 for a service description may be published using any service description language/schema 204 such as, for example, XML, XDS, RDF, RDF-S, WSDL, UDDI, UPnP, OWL, OWL-s, etc. One or more plug-in modules 206 may be provided to convert a service description from its native form, e.g. in a respective service description language 204, to a searchable service description 208 based on a normalized schema 209. The searchable service description 208 may then be published on the overlay network 210.

The searchable service description 208 enables aggregation of all of the information required for service discovery, and the information required to rank-order and access services. Publishing the searchable service description 208 may include extracting keywords from the native service description. Keywords may be extracted, for example, as XML attribute-value pairs, as RDF triples, as simple keywords, or according to any other extraction method. The plug-in module 206 provides the normalized schema 209 that defines specific fields to be extracted and a format for extracting the fields. The normalized schema 209 is not a service description language as it does not provide all of the functionalities of a service description language. Unlike the use of translators, plug-in module 206 does not translate from one service description language to one or more other service description language. Rather, plug-in module 206 facilitates the extraction of certain data from the original service description based on the normalized schema 209. For example, the fields specified by the normalized schema 209 are mapped to particular data in the native service description 204. Accordingly, it is the information that is extracted according to the normalized schema 209 that is published on the overlay network. As such, rather than having multiple versions of a service description, each in a different service description language, published on the network, a single description can be published to the network that can be searched and recognized by any node.

Figure 3:
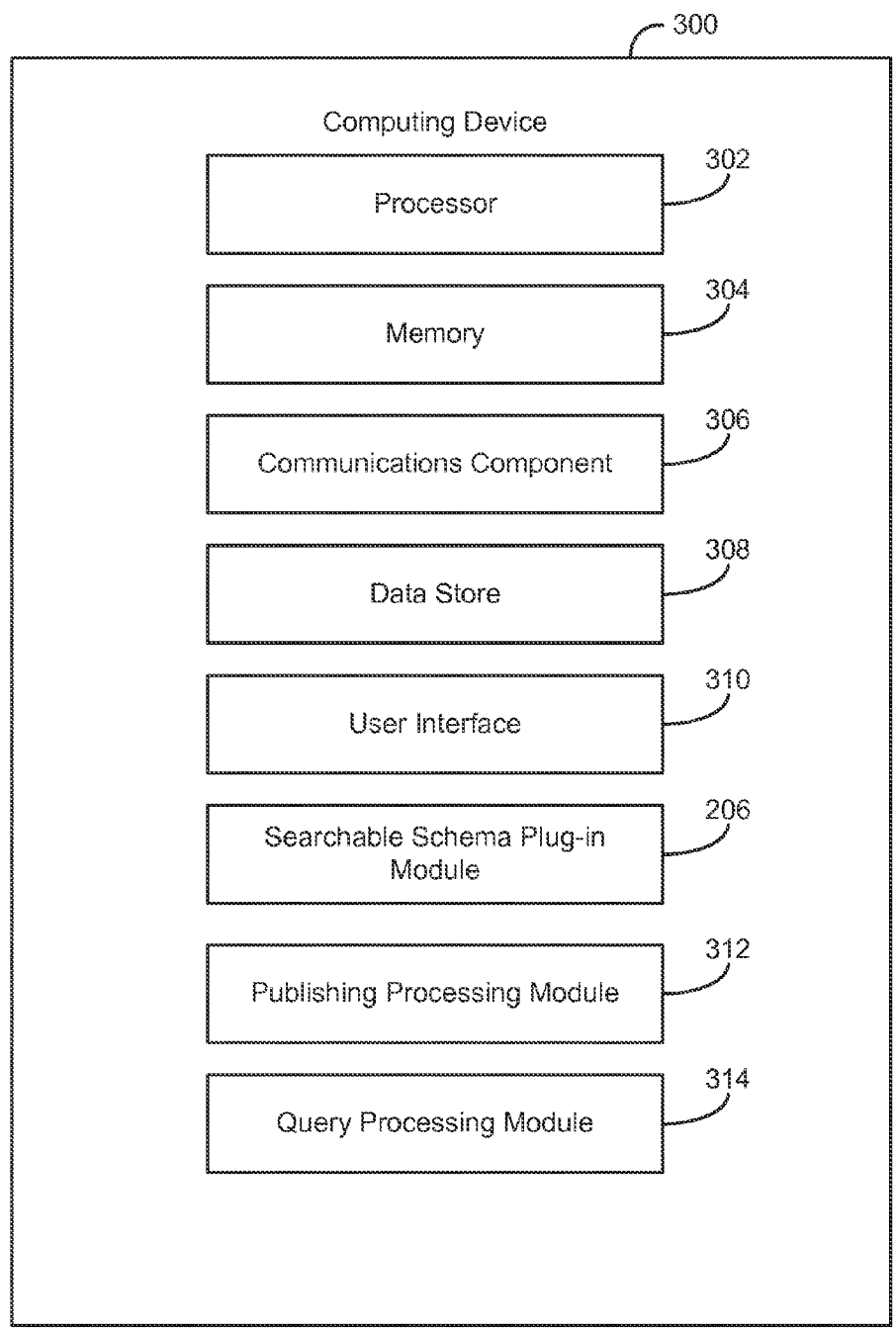
FIG. 3 is a schematic diagram of an aspect of a computing device configured to perform the functionality described herein in the network of FIG. 1 or the system of FIG. 2.

FIG. 3 depicts an exemplary computing device 300 that may serve as a node in a peer-to-peer and/or overlay network. Computing device 300 includes a processor 302 for carrying out processing functions associated with one or more components and functions described herein. Processor 302 can include a single or multiple set of processors or multi-core processors. Moreover, processor 302 can be implemented as an integrated processing system and/or a distributed processing system.

Computing device 300 further includes a memory 304, such as for storing local versions of applications being executed by processor 302. Memory 304 can include any type of memory usable by a computer, such as random access memory (RAM), read only memory (ROM), tapes, magnetic discs, optical discs, volatile memory, non-volatile memory, and any combination thereof.

Further, computer device 300 includes a communications component 306 that provides for establishing and maintaining communications with one or more parties utilizing hardware, software, and services as described herein. Communications component 306 may carry communications between components on computer device 300, as well as between computer device 300 and external devices, such as devices located across a communications network and/or devices serially or locally connected to computer device 300. For example, communications component 306 may include one or more buses, and may further include transmit chain components and receive chain components associated with a transmitter and receiver, respectively, operable for interfacing with external devices. Further, for example, communications component 306 may be configured to enable computer device 300 to communicate with other nodes in an overlay network.

Additionally, computer device 300 may further include a data store 308, which can be any suitable combination of hardware and/or software, that provides for mass storage of information, databases, and programs employed in connection with aspects described herein. For example, data store 308 may be a data repository for applications not currently being executed by processor 302.

Computer device 300 may additionally include a user interface component 310 operable to receive inputs from a user of computer device 300, and further operable to generate outputs for presentation to the user. User interface component 310 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 310 may include one or more output devices, including but not limited to a display, a speaker, a haptic feedback mechanism, a printer, any other mechanism capable of presenting an output to a user, or any combination thereof.

In an aspect, computer device 300 may also include one or more searchable schema plug-in modules 206. For example, the one or more plug-in modules 206 may be stored in memory 304. Each schema plug-in module 206 may be configured to generate searchable service descriptions 208 (FIG. 2) from service descriptions written in any service description language 204 based on a normalized schema 209. The searchable service description 208 is published to the network, and is used to process queries for service. Generating the searchable service description 208 includes extracting keywords from the service description in its native form, and then advertising these keywords in the format of the searchable service description 208 on the network.

Computer device 300 may further include a publishing processing module 312 that facilitates publishing searchable service descriptions 208 (FIG. 2). Additionally, a query processing module 314 may be included for processing queries to the network. When a query is received in a native service description language, query processing module 314 may be configured to translate the query based on the normalized schema 209. Accordingly, the search can be performed of the network. Once search results have been obtained, query processing module 314 may be configured to translate the results back to the native service description language of the original query, and to forward the results to the requester.

Figure 4:
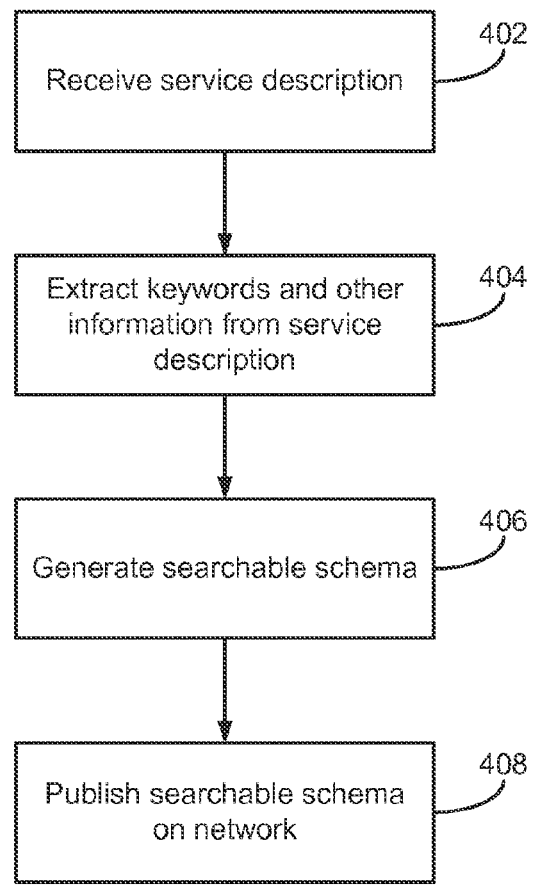
FIG. 4 is a flowchart of an aspect of a method of generating and publishing a searchable service description.

FIG. 4 is a flowchart depicting an exemplary method of generating and publishing a searchable service description. As depicted at 402, the process begins with the receipt of a service description written in a native service description language such as, for example, XML, RDF, WSDL, OWL, and/or any other service description language. Plug-in module 206, depicted in FIGS. 2 and 3, may receive the native language service description.

One or more keywords may be extracted from the service description, as depicted at 404. In addition, other identified information to be published with the keyword is also extracted. Keywords may correspond to, for example, service names, service description language, etc. As depicted at 406, a searchable service description is created using the extracted keywords and the other identified information, based on a normalized schema. The searchable service description may comprise fields such as but not limited to, for example, required, optional, and "publish with keywords." The normalized schema comprises attributes within each field that may be selected from a plurality of attributes in a service description language file. Different service description languages may have different naming conventions for the particular attributes. The normalized schema defines a standard attribute name for each attribute. When extracting keywords and generating the searchable service description, the native attribute value is associated with the appropriate standard attribute name.

The required field comprises all of the information from the native service description that must be published on the network for service discovery. Examples of required information include but are not limited to, for example, the service name associated with the service description, information about the service description language used by the service, etc. The required field may include more than one service description language if the service has been described by multiple languages. In addition, other information such as a text description and/or keywords to facilitate service discovery, information to contact the service, and/or a list of possible keywords that are relevant to the service and not described by other fields may be included in the required field.

The optional field includes all of the information that may be published for service discovery. This field presents additional information to facilitate advanced search and discovery, and may not contain fields that are already in the required field. Examples entities within the optional field may include, for example, information about the possible types of inputs that a service takes, information abut the possible types of outputs that the service produces, preconditions of the service and ranges over a precondition instance defined according to the schema, information about a particular result of the service and under what condition the outputs are generated, information about the publisher, a list of possible keywords that are relevant to the service and not described by the other fields, and/or other information.

The "publish with keyword" field comprises information that needs to be published along with keywords extracted from the required and optional fields. The "publish with keyword" field may include, for example, information that is specific to a particular keyword and is only stored with that chosen keyword, information about the service being described that is stored with all keywords extracted from the service description, and/or other information. For example, information specific to a particular keyword could include the number of times a particular keyword occurs in the document of service description. This information can be useful for relevance-based searching, where the ranking of query results is done based on term-frequency values.

Referring again to FIG. 4, as depicted at 406, the searchable service description created based on the normalized schema may be published to the network. Services described by the searchable service description may then be discovered by a node issuing a search query formatted in any service description language.

Figure 5:
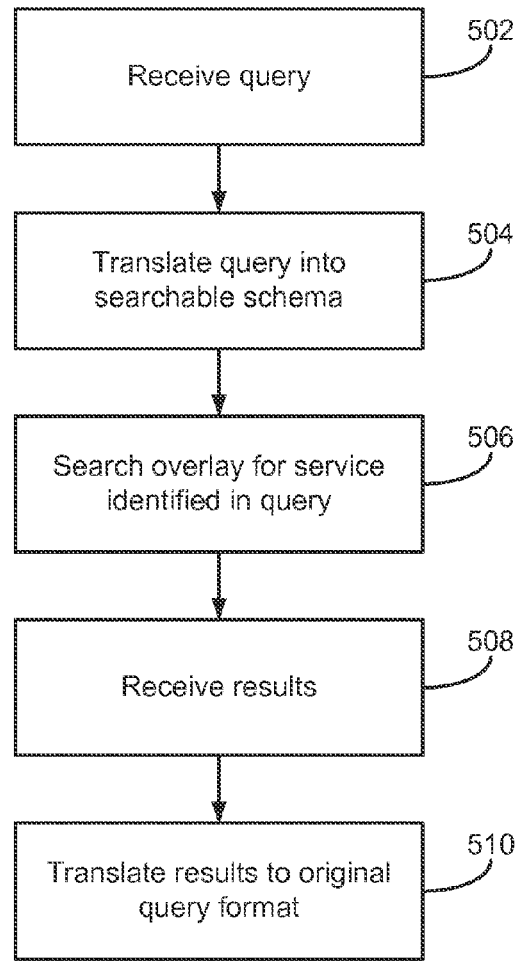
FIG. 5 is a flowchart of an aspect of a method of processing a query for services.

FIG. 5 is a flowchart depicting an exemplary method for processing a query for services. As depicted at 502, the process begins when the query is received in a native search description language. As depicted at 504, the query is then translated, based on the normalized schema, into a service query. As depicted at 506, a search may be performed of the network for services matching the service query. As described herein, the network stores services descriptions that have been formatted based on a normalized schema. As depicted at 508, results of the search query are received. The results are also formatted according to the normalized schema. As depicted at 510, the results are translated into the original or native service description language of the corresponding native search query.

Figure 6:
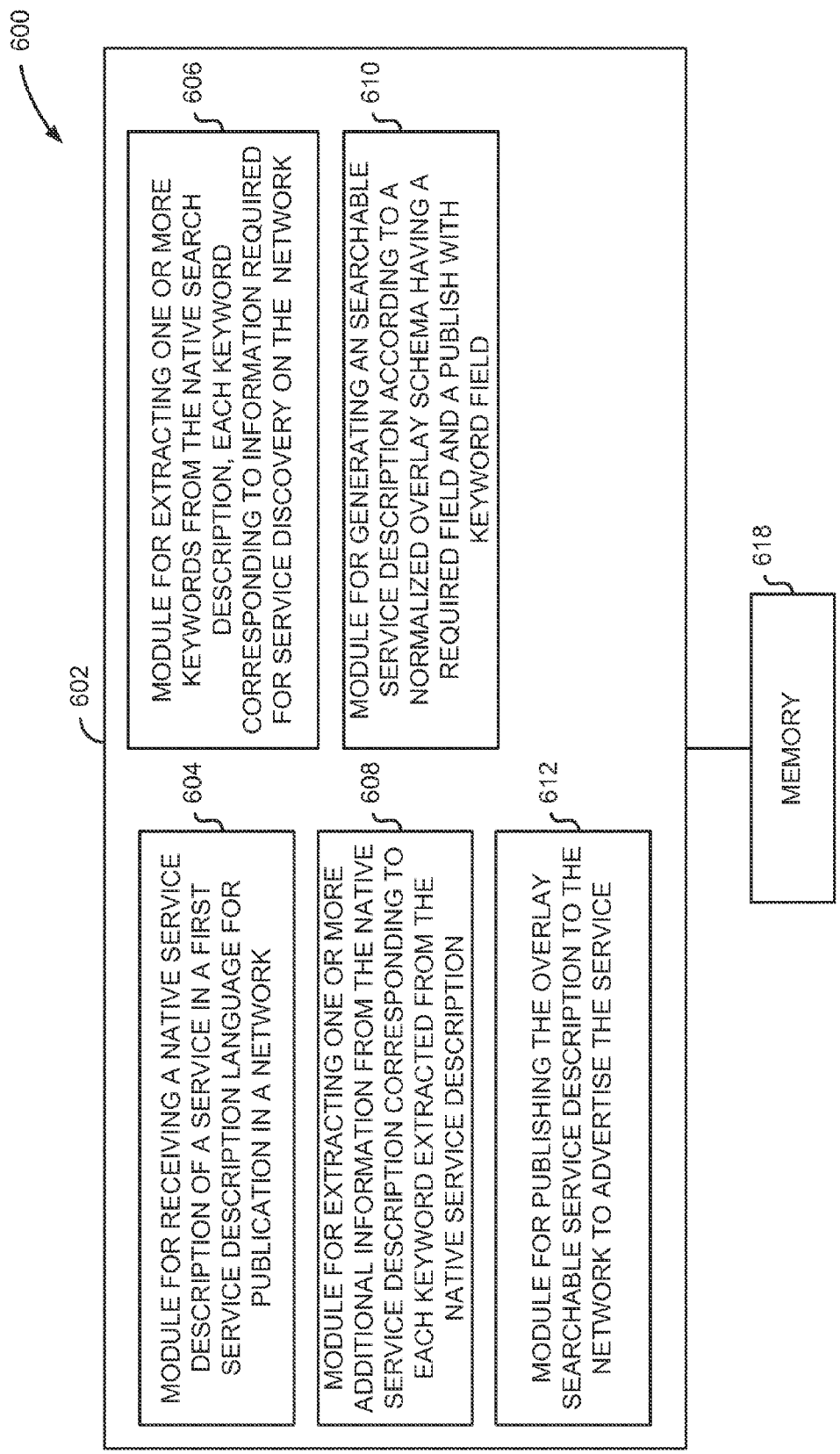
FIG. 6 is a schematic diagram of an aspect of a system for publishing and discovering services in a network.

Turning to FIG. 6, illustrated is a system 600 for publishing and discovering services in a network. As depicted, system 600 includes functional blocks that can represent functions implemented by a processor, software, or combination thereof (e.g., firmware). System 600 includes a logical grouping 602 of electrical components that act in conjunction. System 600 may be implemented, for example, by a computing device acting as a node in a peer-to-peer network.

Logical grouping 602 can include a module for receiving a native service description of a service in a first service description language for publication in a network 604. Moreover, logical grouping 602 can include a module for extracting one or more keywords from the native service description, wherein each keyword corresponds to information required for service discovery on the network 606. Logical grouping 602 may further include a module for extracting one or more additional information from the native service description corresponding to each of the one or more extracted keywords 608; a module for generating a searchable service description according to a normalized schema having a required field and publish with keyword field, wherein the required field comprises each keyword extracted from the native service description, wherein the publish with keyword field comprises the extracted additional information corresponding to each extracted keyword 610; and a module for publishing the searchable service description to the network to advertise the service 612. Additionally, system 600 can include a memory 618 that retains instructions for executing functions associated with electrical components 604-612. While shown as being external to memory 618, it is to be understood that electrical components 604-612 can exist within memory 618.

One example of a normalized schema 209 (FIG. 2) is the Genie Searchable Schema, available from Qualcomm, Inc. As with the normalized schema 209, the Genie Searchable Schema (GSS or Genie) is not a service description language. It does not provide all the functionalities of a service description language and must not be understood as one. The GSS just provides a mechanism to aggregate all the information required for service discovery and information required to rank-order and access services. In Genie, we assume that a service is described using its native service description; this could be OWL-S, WSDL, UPnP, or any other known or yet-to-be-discovered schema. Publishing this information onto the overlay involves two steps. The first step is extracting the keywords from the description. Each extracted keyword can be one of three types, namely, simple keywords, XML attribute-value pairs, and RDF triples. The next step is to advertise these keywords on the overlay. This can be done using a PUT command. The PUT command has as inputs a ResourceName, AuthName, KindID, Name, Value, and Life-Time. Note that the PUT command supports three different kindIDs, namely, KEYWORD, XML_KEYWORD, and RDF_KEYWORD, for three types of keywords.

The GSS, therefore, acts as an intermediate step in service publication. It contains a list of keywords that are extracted from the original service description along with a list of additional side information that may be published along with these keywords. The GSS is an end product of step 1 and provides a node, which may include Genie middleware, with some information about what parts of the service description may be published and what may be stored in the overlay. The GSS itself is not stored as one document in any node in the overlay.

The GSS contains three basic fields:

1. required: Contains all the fields in the native service description that must be published in the overlay.

2. optional: Contains all the information in the native service description that is optional and may be published for service discovery.

3. publishWithKeywords: This field contains all the information that needs to be published along with every keyword extracted from the native service description FIG. 7 depicts an example of the GSS 700. The required field 702 contains all the information that needs to be published on the overlay for service discovery. The required field 702 may contain the following entities as listed below. The required field 702 of any GSS 700 contains servicename and servicedescriptionlanguage and the remaining fields within the required field 702 are optional to include in the GSS 700. Table 1 depicts examples of entries in the required field.

TABLE 1

| Member | Requirement | Description |
| --- | --- | --- |
| servicename | Mandatory | Contains the service name associated with the service description. The servicename can be used as an identifier for the service. |
| servicedescriptionlanguage | Mandatory | Contains information about the service description language used by the service |
| textdescription | Optional | Contains the text description and/or keywords to facilitate service discovery. The service advertisement may add additional keywords if it would like users to search with those keywords. |
| contactInformation | Optional | Contains information about ways to contact the service. See Section Error! Reference source not found.. |
| searchKeywords | Optional | Has a list of possible keywords that are relevant to the service and not described by the other fields. |

The field servicedescriptionlanguage contains information about the service description language used by the service. The required field must contain at least one servicedescriptionlanguage field. The required field may contain more than one servicedescriptionlanguage field if the service has been described by multiple languages. The value in this field needs to be standardized to allow nodes/applications to search for services that are described by a particular language. Possible choices include:

WSDL for Web Service Description Language;

OWLS for OWL-S;

OWL for OWL;

UDDI for Universal Description, Discovery, and Integration;

UPnP for Universal Plug and Play; etc.

The field searchKeywords has a list of possible keywords that are relevant to the service. This information could be extracted from the native service description or could be simply added by the service, application, or node when it publishes the service. The information in the searchKeywords field could be simple keywords, XML attribute-value pairs, or RDF triples. If the keyword is added by external means (via service or application etc), then it is enclosed within the field userDefinedKeyword as in FIG. 7.

The optional field 704 contains all the information that may be published for service discovery. The optional field 704 presents additional information to facilitate advanced search and discovery and may not contain the fields that are already in the required field. All the entities within the optional field are indeed optional and may contain the following entries depicted in Table 2.

TABLE 2

| Member | Description |
| --- | --- |
| hasInput | Contains information about the possible types of inputs that the service takes. |
| hasOutput | Contains information about the possible types of outputs that the service produces. |
| hasPrecondition | Specifies the preconditions of the service and ranges over a Precondition instance defined according to the schema. |
| hasResult | Specifies one of the results of the service and under what conditions the outputs are generated. See [OWL-S] for more information. |
| contactInformation | Contains information about ways to contact the service and may contain fields that are not covered in required field already. |
| servicePublisher | Contains information about the service publisher. |
| searchKeywords | Has a list of possible keywords that are relevant to the service and not described by the other fields. |

The field servicePublisher may have additional sub-fields, namely, servicePublisherName, which contains the name of the publisher; textDescription, which contains the text description and/or keywords about the publisher (the service advertisement may add additional keywords if it would like users to search with those keywords); and contactInformation, which contains information about ways to contact the service.

The field searchKeywords has a list of possible keywords that are relevant to the service and not directly covered in the required field. This information could be extracted from the native service description or could be simply added by the service, application, or node when it publishes the service. The information in the searchKeywords field could be simple keywords, XML attribute-value pairs, or RDF triples. Possible examples include serviceParameter and serviceCategory fields in OWL-S schema. The field serviceParameter has an expandable list of properties that may accompany the profile description in OWL-S. It may have additional sub-fields, namely, serviceParameterName (the name of the actual parameter), and sParameter (points to the value of the parameter). serviceCategory describes categories of services on the basis of some classification that may be outside OWL-S and possibly outside OWL [OWL-S]. It contains the following fields: (a) categoryName: is the name of the actual category, (b) taxonomy: stores a reference to the taxonomy scheme, (c) value: points to the value in a specific taxonomy, and (d) code: stores the code associated with the taxonomy for each type of service. serviceParameter and serviceCategory fields are present in the main Profile description in OWL-S version 1.1 and have been deprecated outside Profile.owl in more recent versions starting with version 1.2. In these versions, these fields can be found in separate files ServiceParameter.owl and ServiceCategory.owl, respectively.

Depending on the amount of information published in the overlay, the optional field and its sub-fields may or may not be published. Therefore, the required and optional fields provide a way for the overlay to decide what must and may be published in the overlay for service discovery.

The publishWithKeyword field 706 contains the information that needs to be published along with keywords extracted from the required and optional fields. The publishWithKeyword field 706 primarily includes two types of information, namely, keywordSpecificInfo, which contains information that is specific to a particular keyword and is stored only with that chosen keyword; and serviceSpecificInfo, which contains information about the service being described. Unlike keywordSpecificInfo, serviceSpecificInfo is a property of the service and is stored with all keywords extracted from the service description. An example of keywordSpecificInfo is numberOfOccurrences, which is the number of times a particular keyword occurs in the document or service description. This information can be useful for relevance-based search, where the ranking of query results is done based on term-frequency values.

Some examples of serviceSpecificInfo are serviceReputation and contactInformation. serviceReputation specifies the reputation of the service. This information can be presented to the user at the end of the search process to help the user choose among the different search results. This reputation score can also be used to rank order the search results. serviceReputation is an optional field within publishWithKeyword. In contrast to serviceReputation, contactInformation field is mandatory within publishWithKeyword and must be published along with every keyword extracted from the required and optional fields. It must contain at least one entry which could be among the following: overlayURI: An URI pointer to the service description document in the overlay; weburi: An URL or URI that is a pointer to the service or the service description (this may not be an overlay specific pointer); contactNode: Information about the node that offers the service, such as the node identifier or nodeID (the contactNode field may contain additional information such as reputation rating of the node and location of the node to facilitate scoping and ranking of results); or contactPerson: Name and contact information of the person responsible for the service. The information contained in publishWithKeyword may be used for rank-ordering and scoping the retrieved results and is published along with the keywords in the DocumentPointer and OtherInfo fields of the keyword PUT command.

One popular service description language is OWL-S. OWL-S provides upper layer ontology for services. The service is described using the service class. The class Service provides an organizational point of reference for a declared Web service. Each instance of Service will present a ServiceProfile description, be describedBy a ServiceModel description, and support a ServiceGrounding description. The ServiceProfile provides the information needed for an agent to discover a service, while the ServiceModel and ServiceGrounding, taken together, provide enough information for an agent to make use of a service, once found. The service profile tells "what the service does" in a way that is suitable for a service-seeking agent to determine whether the service meets its needs. This form of representation may include a description of what is accomplished by the service, limitations on service applicability and quality of service, and requirements that the service requester must satisfy to use the service successfully. The ServiceProfile class in OWL-S provides all the information required for discovering the service and, therefore, this information is sufficient for publication.

The GSS 700, described above, encapsulates and provides a wrapper for the ServiceProfile class in OWL-S. Since the GSS 700 is based on the ServiceProfile, mapping OWL-S properties to GSS fields is straightforward as illustrated in Table 3.

TABLE 3

| GSS Fields | OWL-S Property |
|---|---|
| servicename | profile:serviceName |
| servicedescriptionlanguage | OWLS |
| textdescription | profile:textDescription |
| contactInformation | profile:contactInformation |
| servicePublisher | — |
| hasInput | profile:hasInput |
| hasOutput | profile:hasOutput |
| hasPrecondition | profile:hasPrecondition |
| hasResult | profile:hasResult |
| serviceParameter | profile:serviceParameter in versions 1.1 and below, in serviceParameter.owl in versions 1.2 and above. |
| serviceCategory | profile:serviceCategory in versions 1.1 and below, in serviceParameter.owl in versions 1.2 and above. |
| serviceReputation | profile:qualityRating in versions 1.1 and below, deprecated in versions 1.2 and above. |

Example of the application of GSS 700 to some specific service description languages will now be discussed.

A sample OWL-S service description is provided in Appendix A along with its translation to Genie Searchable Schema 700 in Appendix B. Note that in the example in Appendix A, there are certain fields in the service description such as "actor" whose structure and subfields are not directly defined in the OWL-S schema and are defined in a separate file: http://www.daml.org/services/owl-s/1.0/ActorDefault.owl and indicated using the command: <!ENTITY actor "http://www.daml.org/services/owl-s/1.0/ActorDefault.owl">. Such entries are not directly defined in the GSS schema 700 and can be included in the searchKeywords field.

Another popular service description language is WSDL. WSDL describes a Web service in two fundamental stages: one abstract and one concrete. Within each stage, the description uses a number of constructs to promote reusability of the description and to separate independent design concerns. There are two popular versions of WSDL, namely, WSDL 1.1 and WSDL 2.0. At an abstract level, WSDL describes a Web service in terms of the messages it sends and receives; messages are described independent of a specific wire format using a type system, typically XML Schema. An operation associates a message exchange pattern with one or more messages. A message exchange pattern identifies the sequence and cardinality of messages sent and/or received as well as who they are logically sent to and/or received from. An interface groups together operations without any commitment to transport or wire format. At a concrete level, a binding specifies transport and wire format details for one or more interfaces. An endpoint associates a network address with a binding. And finally, a service groups together endpoints that implement a common interface.

There are several key differences between the two versions of WSDL. These include adding further semantics to the description language, renaming of some message constructs such as changing portType to interface, ports to endpoints, etc, and removing/deprecating some message constructs which are specified using the XML schema type system in version 2.0. Aside from the key differences between the two versions, there is a one-to-one mapping from WSDL 1.1 to WSDL 2.0 and there have been several convertors that help users change existing WSDL 1.1 documents to version 2.0 files. In an aspect, GSS 700 provides a mechanism to convert the WSDL 2.0 service descriptions to GSS 700 and leaves the conversion of WSDL 1.1 to WSDL 2.0 to such convertors.

Unlike the case of OWL-S, WSDL does not have a ServiceProfile and the information required for discovering the service needs to be gleaned from the entire service description. In Table 4, details are provided to show the GSS fields and part of the WSDL 2.0 service description from which they can be extracted. As can be seen in the table, some fields in GSS 700, such as servicename and textdescription, can be obtained from the properties of the WSDL service and some other GSS fields, such as hasInput and hasOutput, can be derived from the properties of the WSDL interface component.

TABLE 4

| GSS Fields | WSDL Property |
|---|---|
| servicename | service:name |
| servicedescriptionlanguage | WSDL |
| textdescription | service:documentation |
| contactInformation | No direct equivalence. Must contain a pointer to the service description or its binding. |
| servicePublisher | No direct equivalence |
| hasInput | interface:operation:input |
| hasOutput | interface:operation:output |
| hasPrecondition | No direct equivalence. WSDL uses interface:faults to address hasPrecondition and hasResult. |
| hasResult | |
| serviceParameter | No equivalence |
| serviceCategory | |
| serviceReputation | |

A sample of the WSDL 1.1 service description is shown in Appendix C and its corresponding WSDL 2.0 and Genie Searchable Schema 700 are shown in Appendix D and Appendix E, respectively.

The Universal Description, Discovery, and Integration (UDDI) protocol is a central element of the group of related standards that comprise the Web services stack. The UDDI specification defines a standard method for publishing and discovering the network-based software components of a service-oriented architecture. Its development is led by the OASIS consortium of enterprise software vendors and customers.

A UDDI registry's functional purpose is the representation of data and metadata about Web services. A registry, either for use on a public network or within an organization's internal infrastructure, offers a standards-based mechanism to classify, catalog, and manage Web services, so that they can be discovered and consumed by other applications. As part of a generalized strategy of indirection among services-based applications, UDDI offers several benefits to IT managers at both design-time and run-time, including increasing code re-use and improving infrastructure management.

The core information model used by a UDDI registry is defined in several XML schemas. XML was chosen because it offers a platform-neutral view of data and allows hierarchical relationships to be described in a natural way. XSD was chosen because of its support for rich data types and its ability to easily describe and validate information based on information models represented in schemas. The UDDI XSD's form a base information model and interaction framework of UDDI registries. The main components of the information model include: A description of a service's business function (called the businessService); Information about the organization that published the service (businessEntity); The service's technical details (bindingTemplate), including a reference to the service's programmatic interface or API; and Various other attributes or metadata such as taxonomy, transports, digital signatures, etc defined in tModels. In Table 5, provided are details to show the GSS fields and part of the UDDI service description from which they can be extracted.

TABLE 5

| GSS Fields | UDDI Property |
|---|---|
| servicename | businessService:name |
| servicedescriptionlanguage | UDDI |
| textdescription | businessService:description, tModels:description |
| contactInformation | Contained within businessEntity:discoveryURLs, businessEntity:contacts, bindingTemplate:bindingKey, and bindingTemplate:serviceKey. |
| servicePublisher | businessEntity:name |
| hasInput | Information contained in tModels that are usually described in WSDL or XSD. Therefore, these fields need to be extracted from the WSDL schema. |
| hasOutput | |
| hasPrecondition | |
| hasResult | |
| serviceParameter | No equivalence |
| serviceCategory | |
| serviceReputation | |

UPnP, derived from phrase "Universal Plug and Play", is a set of networking protocols that aim to provide simple peer-to-peer networking for devices in home and corporate environments. It achieves this goal by defining protocols base on open, Internet-based standards, such as TCP/IP, HTTP, XML and SOAP. UPnP protocols define almost all aspects of peer-to-peer networking, including procedures for addressing, service discovery, service description, and control for service exchange, event notification and presentation.

UPnP defines two classes of functional entities: Device, which offer services, and Control point, through which a user may control services offered by a device. UPnP's service discovery protocol, known as Simple Service Discovery Protocol (SSDP), allows a new device to advertise itself to control points in its network. Similarly, when a control point joins a network, it uses SSDP to search for devices of interest in the network. After a control point discovers a service, it retrieves a comprehensive description of the service (expressed in XML) from the URL it has obtained during service discovery. This service description file contains a list of embedded services, as well as URLs for information on control, event notification and presentation.

In the case of UPnP, the devices multicast (or unicast) a NOTIFY message when they are added to the network or when they renew their advertisements. The NOTIFY message uses:

A NOTIFY verb defined by General Event Notification Architecture (GENA)

The multicast address and port reserved by IRNA for SSDP in the HOST header

A duration for the advertisement in the CACHE-CONTROL header

A location for discovery in the LOCATION header

A specific type for the advertisement in the NT (notification type) header

A subtype in the NTS (notification sub type) header
    ssdp:alive for advertisements (see example in Appendix F)
    ssdp:update for updates (see example in Appendix G)
    ssdp:byebye to cancel advertisements (see example in Appendix H)

A unique ID for this advertisement in the USN (unique serial number) header

The NOTIFY message is given in the following format:
    NOTIFY * HTTP/1.1
    HOST: (HostAddress):(ServicePort)
    CACHE-CONTROL: max-age=LifeTime
    LOCATION: URL for UPnP description for the root device
    NT: search target
    NTS: ssdp:alive
    USN: unique serial number
where
    NOTIFY indicates this message is a service advertisement,
    HOST provides IP address and port number of the advertised service;
devices typically use 239.255.255.250:1900 for NOTIFY messages,
    CACHE-CONTROL sets the life time of the advertised service in seconds,
    LOCATION specifies the URL to the UPnP description for the root device,
    NT specifies the search target of the advertised service,
    NTS indicates the current status of SSDP,
    USN UUID that uniquely identifies the advertisement.

Note that unlike other types of service description languages, UPnP does not define any name for a service as part of the NOTIFY message. The NOTIFY message, however, contains the URL for UPnP description in the LOCATION field and this document contains additional information about the service including the name of the service offered by the device.

The NOTIFY message contains the URL for the UPnP description. When a node publishes a service, it also needs to extract the information from the UPnP description from the LOCATION field of the NOTIFY message and publish it on the overlay. This information is specified in XML. The description is in two parts: one for the device and one per nested service offered by the device. The device description contains the type of device, container properties, and user interface (UI) information specified by the device. The device description is in the XML format. Services are functional units in a device and are contained in a container. The service description file contains the methods and state variables (or properties) and is similar to what would be contained in an OWL-S or WSDL file.

A sample XML file used for describing services is given in Appendix I. In the case of UPnP, the device needs to publish two sets of information. The first one is derived from the NOTIFY message and contains information about the location of the service description and NT/ST values that are required for answering UPnP M-SEARCH queries. The second set of information to be published comes from the device/service description file. To publish the information in the NOTIFY message using the GSS format, the publishing node shall create GSS 800 depicted in FIG. 8.

The NOTIFY messages are used to advertise, update, and delete a device in the overlay. The next step is to publish the device/service description file. Appendix I provides an example of a UPnP device description file written in XML and the corresponding GSS is shown in Appendix J. As can be seen therein, the device description file contains information about the device, the model, model name, manufacturer, and model URI. In addition to this information, the device description file contains information about the services offered by the device enclosed in <service></service> field.

This field contains further information about the service including the URI for the service description file. As part of the publication process, the service offering peer also needs to extract this information and publish it on the overlay in the form of a GSS.

It might be possible that two different schema (or even two different versions of the same scheme such as WSDL in the example) describe the same document/query in different ways while they mean the same thing. For example, a printer service (say service1) in the overlay may be advertised using schema1 with servicename="myprinter" and the search request may be issued using schema2 to find all service descriptions with attribute printername="myprinter". The simple search system would not return service1 since it has a different attribute associated with the value "myprinter" because the schema used in describing the service and formulating the query is different. Another example in the case of OWL-S and WSDL is that these schemas employ different attribute names such as textDescription and documentation, respectively, to refer to commonly used fields. One way to handle such scenarios is to have one simplified generic schema and enforce that all services and queries follow this schema. Such a solution may, however, be too restrictive and may not cope with the demands of new and yet-to-be-defined languages.

GSS 700 takes a simplistic approach to handle this problem. GSS 700 defines a list of standard attribute names for commonly used ones such as servicename, textdescription, hasInput, hasOutput, etc. as described above. For these attributes, GSS 700 extracts the corresponding values from the native service description schema and publish them in the overlay along with the standard attribute names. For other attributes that are not specifically defined in the list, GSS 700 directly publishes the attribute names as defined in the native schema. The plug-ins 206 (FIG. 2) defined above help in this process of publication and translate the native attribute names to the standard attribute names.

Querying follows the same steps as publication. Given a query on the native attribute name, the plug-ins 206 check the list of standard attributes and, if present, translate the native attribute names to the standard ones. This query is sent to the overlay using a SEARCH command with the standard attribute name. In the example of the printer service described earlier, for a query of the form "printername=myprinter", the plug-in will convert the query to "servicename=myprinter" and send the modified query on the overlay. The output of the search will now contain service1 since it has the same attribute associated with "myprinter".

Thus, one example of a normalized overlay schema 209 includes the GSS 700 described above, however, it should be understood that other specific schemas may be developed that embody the above-described functionality of the normalized overlay schema 209.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2"(3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

APPENDIX A

OWL-S Schema for Bravo Air Service

```
<?xml version='1.0' encoding='ISO-8859-1'?>
<!DOCTYPE uridef[
 <!ENTITY rdf "http://www.w3.org/1999/02/22-rdf-syntax-ns">
 <!ENTITY rdfs "http://www.w3.org/2000/01/rdf-schema">
 <!ENTITY owl "http://www.w3.org/2002/07/owl">
 <!ENTITY service "http://www.daml.org/services/owl-s/1.0/Service.owl">
 <!ENTITY profile "http://www.daml.org/services/owl-s/1.0/Profile.owl">
 <!ENTITY actor "http://www.daml.org/services/owl-s/1.0/ActorDefault.owl">
 <!ENTITY addParam "http://www.daml.org/services/owl-
s/1.0/ProfileAdditionalParameters.owl">
 <!ENTITY profileHierarchy "http://www.daml.org/services/owl-s/1.0/ProfileHierarchy.owl">
 <!ENTITY process "http://www.daml.org/services/owl-s/1.0/Process.owl">
 <!ENTITY ba_service "http://www.daml.org/services/owl-s/1.0/BravoAirService.owl">
 <!ENTITY ba_process "http://www.daml.org/services/owl-s/1.0/BravoAirProcess.owl">
 <!ENTITY country "http://www.daml.org/services/owl-s/1.0/Country.owl">
 <!ENTITY concepts "http://www.daml.org/services/owl-s/1.0/Concepts.owl">
 <!ENTITY DEFAULT "http://www.daml.org/services/owl-s/1.0/BravoAirProfile.owl">
]>
<!--
This document uses entity types as a shorthand for URIs.
Download the source for a version with unexpanded entities.
-->
<rdf:RDF
```

OWL-S Schema for Bravo Air Service

```
xmlns:rdf=   "&rdf;#"
xmlns:rdfs=  "&rdfs;#"
xmlns:owl =  "&owl;#"
xmlns:service= "&service;#"
xmlns:process= "&process;#"
xmlns:profile= "&profile;#"
xmlns:actor= "&actor;#"
xmlns:addParam= "&addParam;#"
xmlns:profileHierarchy= "&profileHierarchy;#"
xmlns=       "&DEFAULT;#">
<!--Monika 4/10/03: added namespaces "actor" and "addParam" to take into account the shift of
some of the properties to other namespaces. -->
<owl:Ontology rdf:about="">
  <owl:versionInfo>
    $Id: BravoAirProfile.owl,v 1.19 2003/12/18 02:10:14 martin Exp $
  </owl:versionInfo>
  <rdfs:comment>DAML-S Coalition: BravoAir Example for OWL-S Profile
description</rdfs:comment>
  <owl:imports rdf:resource="&service;" />
  <owl:imports rdf:resource="&profile;" />
  <owl:imports rdf:resource="&actor;" />
  <owl:imports rdf:resource="&addParam;" />
  <owl:imports rdf:resource="&process;" />
  <owl:imports rdf:resource="&ba_service;" />
  <owl:imports rdf:resource="&ba_process;" />
  <owl:imports rdf:resource="&concepts;" />
  <owl:imports rdf:resource="&country;" />
  <owl:imports rdf:resource="&profileHierarchy;" />
</owl:Ontology>
<!-- ################################################################# -->
<!-- # Instance Definition of BravoAir Reservation Agent Advertisement # -->
<!-- ################################################################# -->
<!--
   BraviAur is defined as a AirlineTicketing service. It inherits from the ontology of services that
is an eCommerce service, and that the product it sells products that are restricted to be
CommercialAirlineTravel.
   The same service could be specified outside the hierarchy of services by declaring it an
instance of Profile, and by adjusting the relevant properties accordingly.
     -->
<profileHierarchy:AirlineTicketing rdf:ID="Profile_BravoAir_ReservationAgent">
  <!-- reference to the service specification -->
  <service:presentedBy rdf:resource="&ba_service;#BravoAir_ReservationAgent"/>
  <!-- reference to the process model specification -->
  <profile:has_process rdf:resource="&ba_process;#BravoAir_Process"/>
  <profile:serviceName>BravoAir_ReservationAgent</profile:serviceName>
  <profile:textDescription>
       This service provide flight reservations based on the specification of a flight request.
This typically
       involves a departure airport, an arrival airport, a departure date, and if a return trip is
required, a return
       date. If the desired flight is available, an itinerary and reservation number will be
returned.
  </profile:textDescription>
  <!-- specification of contact information.
     There are two contacts specified here:
     1. to a reservation department
     2. to John Doe that is a sale representative
     The two conctacs are related to the profile through different
     instances of the contactInfo relation
     -->
  <profile:contactInformation>
    <actor:Actor rdf:ID="BravoAir-reservation">
      <actor:name>BravoAir Reservation department</actor:name>
        <actor:title>
         Reservation Representative
        </actor:title>
        <actor:phone>412 268 8780 </actor:phone>
        <actor:fax>412 268 5569 </actor:fax>
        <actor:email>Bravo@Bravoair.com</actor:email>
        <actor:physicalAddress>
            Airstrip 2,
            Teetering Cliff Hights,
            Florida 12321,
            USA
        </actor:physicalAddress>
        <actor:webURL>
        http://www.daml.org/services/daml-s/2001/05/BravoAir.html
```

OWL-S Schema for Bravo Air Service

```
      </actor:webURL>
    </actor:Actor>
  </profile:contactInformation>
  <!-- other contact -->
  <profile:contactInformation>
    <actor:Actor rdf:ID="BravoAir-information">
      <actor:name>John Doe</actor:name>
      <actor:title>Sale Representative</actor:title>
        <actor:phone>412 268 8789 </actor:phone>
        <actor:fax>412 268 5569 </actor:fax>
        <actor:email>John_Doe@Bravoair.com</actor:email>
        <actor:physicalAddress>
            Airstrip 2,
            Teetering Cliff Hights,
            Florida 12321,
            USA
        </actor:physicalAddress>
        <actor:webURL>
           http://www.daml.org/services/daml-s/2001/05/BravoAir.html
      </actor:webURL>
    </actor:Actor>
  </profile:contactInformation>
  <!-- description of Geographic radius as a service parameter. rather than a direct property of
profile as in version 0.6 -->
  <profile:serviceParameter>
    <addParam:GeographicRadius rdf:ID="BravoAir-geographicRadius">
        <profile:serviceParameterName>
          BravoAir Geographic Radius
        </profile:serviceParameterName>
        <profile:sParameter rdf:resource="&country;#UnitedStates"/>
    </addParam:GeographicRadius>
  </profile:serviceParameter>
  <!-- specification of quality rating for profile -->
  <profile:qualityRating>
    <profile:QualityRating rdf:ID="BravoAir-goodRating">
        <profile:ratingName>
          SomeRating
        </profile:ratingName>
        <profile:rating rdf:resource="&concepts;#GoodRating"/>
    </profile:QualityRating>
  </profile:qualityRating>
  <!-- Specification of the service category using NAICS -->
  <profile:serviceCategory>
    <addParam:NAICS rdf:ID="NAICS-category">
        <profile:value>
          Airline reservation services
        </profile:value>
        <profile:code>
          561599
        </profile:code>
    </addParam:NAICS>
  </profile:serviceCategory>
  <!-- Specification of the service category using UN-SPSC -->
  <profile:serviceCategory>
    <addParam:UNSPSC rdf:ID="UNSPSC-category">
        <profile:value>
          Travel Agent
        </profile:value>
        <profile:code>
          90121500
        </profile:code>
    </addParam:UNSPSC>
  </profile:serviceCategory>
  <!-- Descriptions of IOPEs -->
  <profile:hasInput rdf:resource="&ba_process;#DepartureAirport_In"/>
  <profile:hasInput rdf:resource="&ba_process;#ArrivalAirport_In"/>
  <profile:hasInput rdf:resource="&ba_process;#OutboundDate_In"/>
  <profile:hasInput rdf:resource="&ba_process;#InboundDate_In"/>
  <profile:hasInput rdf:resource="&ba_process;#RoundTrip_In"/>
  <profile:hasInput rdf:resource="&ba_process;#PreferredFlightItinerary_In"/>
  <profile:hasOutput rdf:resource="&ba_process;#AvailableFlightItineraryList_Out"/>
  <profile:hasInput rdf:resource="&ba_process;#AcctName_In"/>
  <profile:hasInput rdf:resource="&ba_process;#Password_In"/>
           <profile:hasInput rdf:resource="&ba_process;#ReservationID_In"/>
  <profile:hasInput rdf:resource="&ba_process;#Confirm_In"/>
  <profile:hasOutput rdf:resource="&ba_process;#PreferredFlightItinerary_Out"/>
  <profile:hasOutput rdf:resource="&ba_process;#AcctName_Out"/>
```

| OWL-S Schema for Bravo Air Service |
|---|
| ```xml
<profile:hasOutput rdf:resource="&ba_process;#ReservationID_Out"/>
<profile:hasEffect rdf:resource="&ba_process;#HaveSeat"/>
</profileHierarchy:AirlineTicketing>
</rdf:RDF>
``` |

APPENDIX B

| Genie Searchable Schema for Bravo Air Service |
|---|
| ```xml
<gss>
    <servicename>BravoAir_ReservationAgent</servicename>
    <servicedescriptionlanguage>OWLS</servicedescriptionlanguage>
      <textdescription>
      This service provide flight reservations based on the specification of a flight request. This typically
      involves a departure airport, an arrival airport, a departure date, and if a return trip is required, a return
      date. If the desired flight is available, an itinerary and reservation number will be returned.
      </textdescription>
      <!--No contact information stored in the required field -->
      <searchKeywords>
          <userDefinedKeyword>Air</userDefinedKeyword>
          <userDefinedKeyword>Service</userDefinedKeyword>
      </searchKeywords>
  <optional>
    <!--Primary contacts may be optionally published -->
    <contactInformation>
        <actor:Actor rdf:ID="BravoAir-reservation">
           <actor:name>BravoAir Reservation department</actor:name>
           <actor:title>Reservation Representative</actor:title>
        </actor:Actor>
    </contactInformation>
      <searchKeywords>
          <serviceParameter>
             <addParam:GeographicRadius rdf:ID="BravoAir-geographicRadius">
                 <serviceParameterName> BravoAir Geographic Radius </serviceParameterName>
                 <sParameter rdf:resource="&country;#UnitedStates"/>
             </addParam:GeographicRadius>
          </serviceParameter>
          <!-- Specification of the service category using NAICS -->
          <serviceCategory>
             <addParam:NAICS rdf:ID="NAICS-category">
               <value>Airline reservation services </value>
               <code> 561599</code>
             </addParam:NAICS>
          </serviceCategory>
          <!-- Specification of the service category using UN-SPSC -->
          <serviceCategory>
             <addParam:UNSPSC rdf:ID="UNSPSC-category">
                <value> Travel Agent </value>
                <code> 90121500 </code>
             </addParam:UNSPSC>
          </serviceCategory>
      </searchKeywords>
      <!-- inputs and outputs -->
      <hasInput rdf:resource="&ba_process;#DepartureAirport_In"/>
      <hasInput rdf:resource="&ba_process;#ArrivalAirport_In"/>
      <hasInput rdf:resource="&ba_process;#OutboundDate_In"/>
      <hasInput rdf:resource="&ba_process;#InboundDate_In"/>
      <hasInput rdf:resource="&ba_process;#RoundTrip_In"/>
      <hasInput rdf:resource="&ba_process;#PreferredFlightItinerary_In"/>
      <hasOutput rdf:resource="&ba_process;#AvailableFlightItineraryList_Out"/>
      <hasInput rdf:resource="&ba_process;#AcctName_In"/>
      <hasInput rdf:resource="&ba_process;#Password_In"/>
      <hasInput rdf:resource="&ba_process;#ReservationID_In"/>
      <hasInput rdf:resource="&ba_process;#Confirm_In"/>
      <hasOutput rdf:resource="&ba_process;#PreferredFlightItinerary_Out"/>
      <hasOutput rdf:resource="&ba_process;#AcctName_Out"/>
      <hasOutput rdf:resource="&ba_process;#ReservationID_Out"/>
``` |

Genie Searchable Schema for Bravo Air Service

```
        <hasResult rdf:resource="&ba_process;#HaveSeat"/>
    </optional>
    <publishWithKeywords>
      <serviceSpecificInfo>
          <!-- Not all the contactInformation present in the native service description needs to be
              published as part of publishWithKeywords. In this example, one is included along with the
              document pointer -->
           <contactInformation>
              <overlayURI>DocumentPointer</overlayURI>
              <actor:Actor rdf:ID="BravoAir-reservation">
                 <actor:name>BravoAir Reservation department</actor:name>
                 <actor:title>Reservation Representative</actor:title>
                 <actor:phone>412 268 8780 </actor:phone>
                 <actor:fax>412 268 5569 </actor:fax>
                 <actor:email>Bravo@Bravoair.com</actor:email>
                 <actor:physicalAddress>
                    Airstrip 2,
                    Teetering Cliff Hights,
                    Florida 12321,
                    USA
                 </actor:physicalAddress>
                 <actor:webURL>
                       http://www.daml.org/services/daml-s/2001/05/BravoAir.html
                 </actor:webURL>
              </actor:Actor>
           </contactInformation>
           <!-reputationRating -->
            <serviceReputation>
               <QualityRating rdf:ID="BravoAir-goodRating">
                   <ratingName>SomeRating</ratingName>
                   <rating rdf:resource="&concepts;#GoodRating"/>
               </QualityRating>
            </serviceReputation>
       </serviceSpecificInfo>
       <keywordSpecificInfo name="Reservation">
            <numberOfOccurances>10</numberOfOccurances>
       </keywordSpecificInfo>
    </publishWithKeywords>
</gss>
```

APPENDIX C

WSDL 1.1 schema for the Stock Quota Service

```
<?xml version="1.0"?>
<definitions name="StockQuote"
targetNamespace="http://example.com/stockquote.wsdl"
     xmlns:tns="http://example.com/stockquote.wsdl"
     xmlns:xsd1="http://example.com/stockquote.xsd"
     xmlns:soap="http://schemas.xmlsoap.org/wsdl/soap/"
     xmlns="http://schemas.xmlsoap.org/wsdl/">
  <types>
   <schema targetNamespace="http://example.com/stockquote.xsd"
       xmlns="http://www.w3.org/2000/10/XMLSchema">
     <element name="TradePriceRequest">
        <complexType>
           <all>
              <element name="tickerSymbol" type="string"/>
           </all>
        </complexType>
     </element>
     <element name="TradePrice">
        <complexType>
           <all>
              <element name="price" type="float"/>
           </all>
        </complexType>
     </element>
   </schema>
  </types>
<message name="GetLastTradePriceInput">
    <part name="body" element="xsd1:TradePriceRequest"/>
  </message>
  <message name="GetLastTradePriceOutput">
     <part name="body" element="xsd1:TradePrice"/>
  </message>
  <portType name="StockQuotePortType">
    <operation name="GetLastTradePrice">
       <input message="tns:GetLastTradePriceInput"/>
       <output message="tns:GetLastTradePriceOutput"/>
    </operation>
  </portType>
  <binding name="StockQuoteBinding" type="tns:StockQuotePortType">
     <soap:binding style="document"
transport="http://schemas.xmlsoap.org/soap/http"/>
     <operation name="GetLastTradePrice">
       <soap:operation
soapAction="http://example.com/GetLastTradePrice"/>
       <input>
          <soap:body use="literal"/>
       </input>
       <output>
          <soap:body use="literal"/>
       </output>
     </operation>
  </binding>
  <service name="StockQuoteService">
     <documentation>My first service</documentation>
     <port name="StockQuotePort" binding="tns:StockQuoteBinding">
        <soap:address location="http://example.com/stockquote"/>
```

| WSDL 1.1 schema for the Stock Quota Service |
|---|
| ```
    </port>
  </service>
</definitions>
``` |

APPENDIX D

| Converting WSDL 1.1 Schema of the Stock Quote Service to WSDL 2.0 |
|---|
| Example from [WSDLExample]<br>```
<?xml version="1.0"?>
<description targetNamespace="http://example.com/stockquote.wsdl"
    xmlns:tns="http://example.com/stockquote.wsdl"
    xmlns:xsd1="http://example.com/stockquote.xsd"
    xmlns:wsoap=" http://www.w3.org/2004/08/wsdl/soap12"
    xmlns=" http://www.w3.org/2004/08/wsdl">
  <types>
    <schema targetNamespace="http://example.com/stockquote.xsd"
        xmlns="http://www.w3.org/2000/10/XMLSchema">
      <element name="TradePriceRequest">
        <complexType>
          <all>
            <element name="tickerSymbol" type="string"/>
          </all>
        </complexType>
      </element>
      <element name="TradePrice">
        <complexType>
          <all>
            <element name="price" type="float"/>
          </all>
``` |

| Converting WSDL 1.1 Schema of the Stock Quote Service to WSDL 2.0 |
|---|
| ```
        </complexType>
      </element>
    </schema>
  </types>
  <interface name="StockQuote">
    <operation name="GetLastTradePrice"
        pattern="http://www.w3.org/2004/03/wsdl/in-out">
      <input messageLable = "In"
          element="xsd1:TradePriceRequest"/>
      <output messageLable = "Out"
          element="xsd1:TradePrice"/>
    </operation>
  </interface>
  <binding name="StockQuoteBinding"
      interface="tns:StockQuote"
      type ="http://www.w3.org/2004/08/wsdl/soap12"
      wsoap:protocol="http://www.w3.org/2003/05/soap/
      bindings/HTTP"
      wsoap:mepDefault="http://www.w3.org/2003/05/soap/mep/
      request-response">
    <operation ref="tns:GetLastTradePrice">
        wsoap:action="http://example.com/GetLastTradePrice"/>
    </operation>
  </binding>
  <service name="StockQuoteService" interface="tns:StockQuote">
    <documentation>My first service</documentation>
    <endpoint name="StockQuotePort"
        binding="tns:StockQuoteBinding"
        address ="http://example.com/stockquote"/>
    </endpoint>
  </service>
</description>
``` |

APPENDIX E

| GSS schema for Stock Quote Service |
|---|
| ```
<gss>
    <servicename> StockQuoteService</servicename>
    <servicedescriptionlanguage>WSDL</servicedescriptionlanguage>
    <textdescription> My first service</textdescription>
    <!--User defined keywords may be additionally specified -->
  <optional>
    <hasInput>TradePriceRequest</hasInput>
    <hasInput>tickerSymbol</hasInput>
    <!-Information about TradePrice and price obtained by parsing input and output types -->
    <hasOutput>TradePrice</hasOutput>
    <hasOutput>price</hasOutput>
    <searchKeywords>
        <operation name="GetLastTradePrice"
            pattern="http://www.w3.org/2004/03/wsdl/in-out">
          <input messageLable = "In"
              element="xsd1:TradePriceRequest"/>
          <output messageLable = "Out"
              element="xsd1:TradePrice"/>
        </operation>
    </searchKeywords>
  </optional>
  <publishWithKeywords>
    <serviceSpecificInfo>
        <contactInformation>
            <!-overlayURI pointer MUST be published along with all keywords -->
            <overlayURI>DocumentPointer</overlayURI>
        </contactInformation>
    </serviceSpecificInfo>
    <!-keywordSpecificInfo declared here
        In this example, the information pertaining to "StockQuoteService" will be published only with this
        Keyword, and so on -->
    <keywordSpecificInfo name=" StockQuoteService">
        <numberOfOccurances>1</numberOfOccurances>
``` |

| GSS schema for Stock Quote Service |
|---|
| ```
    </keywordSpecificInfo>
    <keywordSpecificInfo name="GetLastTradePrice">
        <numberOfOccurances>1</numberOfOccurances>
    </keywordSpecificInfo>
  </publishWithKeywords>
</gss>
``` |

APPENDIX F

Publishing a UPnP Device Using NOTIFY

The following specifies the UPnP command for publishing a UPnP service:
NOTIFY * HTTP/1.1
HOST: (HostAddress):(ServicePort)
CACHE-CONTROL: max-age=LifeTime
LOCATION: URL for UPnP description for the root device
NT: search target
NTS: ssdp:alive
USN: unique serial number
This information is represented in GSS as follows:

```
<gss>
        <servicedescriptionlanguage>upnp</servicedescriptionlanguage>
        <contactInformation>
            <weburi>location of the service description</weburi>
        </contactInformation>
        <searchKeywords>
            <NT> (search target) </NT>
            <host>(HostAddress):(ServicePort)</host>
            <USN> (unique serial number) </USN>
        </searchKeywords>
</gss>
```

Once this information is converted to GSS, the publishing node needs to download the XML device/service description file from the LOCATION field and publish it separately on the overlay.

APPENDIX G

Updating a UPnP Device Using NOTIFY

The following specifies the UPnP command for updating a UPnP service:
NOTIFY * HTTP/1.1
HOST: (HostAddress):(ServicePort)
CACHE-CONTROL: max-age=LifeTime
LOCATION: URL for UPnP description for the root device
NT: search target
NTS: ssdp:update
USN: unique serial number
This information is represented in GSS similar to how a service is published as follows:

```
<gss>
        <servicedescriptionlanguage>upnp</servicedescriptionlanguage>
        <contactInformation>
            <weburi>location of the service description</weburi>
```

```
        </contactInformation>
        <searchKeywords>
            <NT> (search target) </NT>
            <host>(HostAddress):(ServicePort)</host>
            <USN> (unique serial number) </USN>
        </searchKeywords>
</gss>
```

Once this information is converted to GSS, the publishing node also needs to download the XML device/service description file from the LOCATION field and publish it again on the overlay to ensure that the overlay has the updated information.

APPENDIX H

Deleting a UPnP Device Using NOTIFY

The following specifies the UPnP command for deleting a UPnP service:
NOTIFY * HTTP/1.1
HOST: (HostAddress):(ServicePort)
NT: search target
NTS: ssdp:byebye
USN: unique serial number
The peer responsible for the service needs to maintain a table with a list of services that it offers along with a location of the device/service description file. Once the delete command is issued using the NOTIFY message (as above), the responsible peer needs to obtain the device/service description file and send delete commands for each keyword in the file. Alternatively, the storing nodes may delete the keywords when the lifetime expires.

APPENDIX I

| Example XML Schema for a UPnP device |
|---|
| ```
<?xml version="1.0"?>
<root xmlns="urn:schemas-upnp-org:device-1.0">
    <specVersion><major>1</major> <minor>0</minor>
</specVersion>
    <URLBase>base URL for all relative URLs</URLBase>
    <device>
        <friendlyName>short user-friendly title</friendlyName>
        <manufacturer>manufacturer name</manufacturer>
        <manufacturerURL>URL to manufacturer site</manufacturerURL>
        <modelDescription>long user-friendly title</modelDescription>
        <modelName>model name</modelName>
        <modelNumber>model number</modelNumber>
        <modelURL>URL to model site</modelURL>
        <serialNumber>manufacturer's serial number</serialNumber>
        <UDN>uuid:UUID</UDN>
        <UPC>Universal Product Code</UPC>
        <device Type>
``` |

| Example XML Schema for a UPnP device |
|---|
| urn:schemas-upnp-org:device:device Type<br>    </device Type><br>    <serviceList><br>        <service><br>            <servicetype>urn:schemas-upnp-org:service:service Type:v</service Type><br>            <serviceId>urn:upnp-org:serviceID:serviceID</serviceID><br>            <SCPDURL>URL to service description</SCPSURL><br>            <controlURL>URL for control</controlURL><br>            <eventSubURL>URL for eventing</eventSubURL><br>        </service><br>        <service><br>            <serviceType>urn:schemas-upnp-org:service:service Type:v</service Type><br>            <serviceId>urn:upnp-org:serviceId:serviceID</serviceId><br>            <SCPDURL>URL to service description</SCPDURL><br>            <controlURL>URL for control</controlURL><br>            <eventSubURL>URL for eventing</eventSubURL><br>        </service><br>        <!-- Declarations for other services (if any) go here --><br>    </serviceList><br>    <deviceList>Description of embedded devices (if any) go here</deviceList><br>    <iconList><br>        <icon><br>            <mimetype>image/format</mimetype><br>            <width>horizontal pixels</width><br>            <height>vertical pixels</height><br>            <depth>color depth</depth><br>            <url>URL to icon</url><br>        </icon><br>        <!-- XML to declare other icons, if any, go here --><br>    </iconList><br><presentationURL>URL for presentation</presentationURL><br>    </device><br></root> |

APPENDIX J

| Converting the XML schema to GSS |
|---|
| <gss><br>  <required><br>    <servicedescriptionlanguage>UPnP</servicedescriptionlanguage><br>  </required><br>  <optional><br>    <searchKeywords><br>      <friendlyName>short user-friendly title</friendlyName><br>      <manufacturer>manufacturer name</manufacturer><br>      <manufacturerURL>URL to manufacturer site</manufacturerURL><br>      <modelDescription>long user-friendly title</modelDescription><br>      <modelName>model name</modelName><br>      <modelNumber>model number</modelNumber><br>      <modelURL>URL to model site</modelURL><br>      <serialNumber>manufacturer's serial number</serialNumber><br>      <UDN>uuid:UUID</UDN><br>      <UPC>Universal Product Code</UPC><br>      <deviceType>urn:schemas-upnp-org:device:deviceType</deviceType><br>      <serviceList><br>        <service><br>          <serviceType><br>            urn:schemas-upnp-org:service:serviceType:v<br>          </serviceType><br>          <serviceId>urn:upnp-org:serviceId:serviceID</serviceId><br>          <SCPDURL>URL to service description</SCPDURL><br>          <controlURL>URL for control</controlURL><br>          <eventSubURL>URL for eventing</eventSubURL><br>        </service><br>      </serviceList><br>    </searchKeywords> |

| Converting the XML schema to GSS |
|---|
|   </optional><br>  <publishWithKeywords><br>    <serviceSpecificInfo><br>      <manufacturerURL>URL to manufacturer site</manufacturerURL><br>      <modelURL>URL to model site</modelURL><br>      <UDN>uuid:UUID</UDN><br>      <UPC>Universal Product Code</UPC><br>      <contactInformation><br>        <overlayUrl> URL to service description</weburi><br>      </contactInformation><br>    </serviceSpecificInfo><br>  </publishWithKeywords><br></gss> |

What is claimed is:

1. A method of publishing or discovering services in a network, comprising:
  receiving a native service description of a service in a first service description language for publication in a network;
  extracting one or more keywords from the native service description, wherein each keyword corresponds to information required for service discovery on the network;
  extracting one or more additional information directly from the native service description corresponding to each of the one or more extracted keywords, wherein the native service description includes the one or more additional information;
  generating a searchable service description according to a normalized schema having a required field and a publish with keyword field, wherein the required field comprises each keyword extracted from the native service description, wherein the publish with keyword field comprises the extracted additional information corresponding to each extracted keyword, and wherein a second required field in the searchable service description indicates the first service description language of the native service description; and
  publishing the searchable service description to the network to advertise the service.

2. The method of claim 1, wherein the required field and the publish with keyword field of the normalized schema are each mapped to one or more corresponding properties in each of a plurality of native service description languages.

3. The method of claim 2, wherein the mapping further comprises selecting a standard attribute name selected from a plurality of standard attribute names corresponding to the native service description attribute name, and associating the standard attribute name with a native attribute value extracted from the native service description corresponding to the native service description attribute name, and wherein the generating further comprises generating the searchable service description with the standard attribute name and the corresponding native attribute value.

4. The method of claim 2, wherein the mapping further comprises extracting the native service description attribute name and the corresponding native attribute value from the native service description, and wherein the generating further comprises generating the searchable service description with the native service description attribute name and the corresponding native attribute value.

5. The method of claim 1, wherein generating the searchable service description further comprises generating a normalized eXtensible Markup Language (XML) attribute-value pair or a Resource Description Framework (RDF) triple.

6. The method of claim 1, further comprising:
wherein extracting one or more keywords further comprises extracting a first keyword corresponding to a service name and a second keyword corresponding to a service description language; and
wherein extracting additional information further comprises extracting one or more of keyword specific information corresponding to each extracted keyword or service specific information corresponding to each extracted keyword.

7. The method of claim 6, further comprising:
wherein extracting one or more keywords further comprises extracting one or more of a third keyword corresponding to a text description including additional search keywords, a fourth keyword corresponding to contact information describing how to contact the service, and a fifth keyword corresponding to a list of search keyword relevant to the service and not described by other fields; and
wherein extracting keyword specific information further comprises extracting a number of occurrences each keyword occurs;
wherein extracting service specific information further comprises extracting at least one of service reputation or contact information.

8. The method of claim 1, further comprising:
extracting one or more optional information from the native service description corresponding to each of the one or more extracted keywords, wherein each optional information is not required for service discovery;
wherein the generating further comprises generating the searchable service description according to the normalized schema further having an optional field, wherein the optional field comprises each optional information corresponding to each extracted keyword.

9. The method of claim 8, wherein the optional information comprises at least one of:
information about a type of input that the service takes;
information about a type of output that the service produces;
information about a precondition of the service and ranges over a precondition instance;
information about one of the results of the service and under what conditions the outputs are generated;
information about ways to contact the service;
information about a publisher of the service; and
a list of other keywords relevant to the service and not described by other fields.

10. The method of claim 1, further comprising:
receiving a native service query in a second native service description language;
translating the native service query into a searchable query according to the normalized schema;
receiving query results in the normalized schema;
translating the query results from the normalized schema to the second native service description language to define native query results; and
transmitting the native query results.

11. The method of claim 1, wherein the network is a distributed overlay network.

12. The method of claim 1, wherein the network comprises a server configured to provide discovery services.

13. At least one processor configured to publish or discover services in a network, comprising:

a first module for receiving a native service description of a service in a first service description language for publication in a network;
a second module for extracting one or more keywords from the native service description, wherein each keyword corresponds to information required for service discovery on the network, for extracting one or more additional information directly from the native service description corresponding to each of the one or more extracted keywords, wherein the native service description includes the one or more additional information, for generating a searchable service description according to a normalized schema having a required field and a publish with keyword field, wherein the required field comprises each keyword extracted from the native service description, wherein the publish with keyword field comprises the extracted additional information corresponding to each extracted keyword, and wherein a second required field in the searchable service description indicates the first service description language of the native service description; and
a third module for publishing the searchable service description to the network to advertise the service.

14. A computer program product, comprising:
a non-transitory computer-readable medium comprising:
a first set of codes for causing a computer to receive a native service description of a service in a first service description language for publication in a network;
a second set of codes for causing the computer to extract one or more keywords from the native service description, wherein each keyword corresponds to information required for service discovery on the network;
a third set of codes for causing the computer to extract one or more additional information directly from the native service description corresponding to each of the one or more extracted keywords, wherein the native service description includes the one or more additional information;
a fourth set of codes for causing the computer to generate a searchable service description according to a normalized schema having a required field and a publish with keyword field, wherein the required field comprises each keyword extracted from the native service description, wherein the publish with keyword field comprises the extracted additional information corresponding to each extracted keyword, and wherein a second required field in the searchable service description indicates the first service description language of the native service description; and
a fifth set of codes for causing the computer to publish the searchable service description to the network to advertise the service.

15. An apparatus, comprising:
means for receiving a native service description of a service in a first service description language for publication in a network;
means for extracting one or more keywords from the native service description, wherein each keyword corresponds to information required for service discovery on the network, for extracting one or more additional information directly from the native service description corresponding to each of the one or more extracted keywords, wherein the native service description includes the one or more additional information, and for generating a searchable service description according to a normalized schema having a required field and a publish with keyword field, wherein the required field comprises each keyword extracted from the native service description, wherein the publish with keyword field comprises the extracted additional information corresponding to each extracted keyword, and wherein a second required field in the searchable service description indicates the first service description language of the native service description; and means for publishing the searchable service description to the network to advertise the service.

16. An apparatus for publishing services in a network, comprising:

a receiver configured to receive a native service description of a service in a first service description language for publication in a network;

a searchable schema plug-in component configured to extract one or more keywords from the native service description, wherein each keyword corresponds to information required for service discovery on the network; to extract one or more additional information directly from the native service description corresponding to each of the one or more extracted keywords, wherein the native service description includes the one or more additional information; and to generate a searchable service description according to a normalized schema having a required field and a publish with keyword field, wherein the required field comprises each keyword extracted from the native service description, and wherein the publish with keyword field comprises the extracted additional information corresponding to each extracted keyword, and wherein a second required field in the searchable service description indicates the first service description language of the native service description; and a publishing processing component configured to publish the searchable service description to the network to advertise the service.

17. The apparatus of claim 16, wherein the searchable schema plug-in component is further configured to map each of the required field and the publish with keyword field of the normalized schema to one or more corresponding properties in each of a plurality of native service description languages.

18. The apparatus of claim 17, wherein the searchable schema plug-in component is further configured to select a standard attribute name selected from a plurality of standard attribute names corresponding to the native service description attribute name, and associate the standard attribute name with a native attribute value extracted from the native service description corresponding to the native search description attribute name, and to generate the searchable service description with the standard attribute name and the corresponding native attribute value.

19. The apparatus of claim 17, wherein searchable schema plug-in component is further configured to extract the native service description attribute name and the corresponding native attribute value from the native service description, and to generate the searchable service description with the native service description attribute name and the corresponding native attribute value.

20. The apparatus of claim 16, wherein the searchable schema plug-in component is further configured to generate a normalized eXtensible Markup Language (XML) attribute-value pair or a Resource Description Framework (RDF) triple.

21. The apparatus of claim 16, wherein the searchable schema plug-in component is further configured to extract a first keyword corresponding to a service name and a second keyword corresponding to a service description language, and to extract one or more of keyword specific information corresponding to each extracted keyword or service specific information corresponding to each extracted keyword.

22. The apparatus of claim 21, wherein the searchable schema plug-in component is further configured to extract one or more a third keyword corresponding to a text description including additional search keywords, a fourth keyword corresponding to contact information describing how to contact the service, and a fifth keyword corresponding to a list of search keywords relevant to the service and not described by other fields; to extract a number of occurrences for each keyword, and to extract at least one of service reputation or contact information.

23. The apparatus of claim 16, wherein the searchable schema plug-in component is further configured to extract one or more optional information from the native service description corresponding to each of the one or more extracted keywords, wherein each optional information is not required for service discovery; and to generate the searchable service description according to the normalized schema further having an optional field, wherein the optional field comprises each optional information corresponding to each extracted keyword.

24. The apparatus of claim 23, wherein the optional information comprises at least one of:

information about a type of input that the service takes;

information about a type of output that the service produces;

information about a precondition of the service and ranges over a precondition instance;

information about one of the results of the service and under what conditions the outputs are generated;

information about ways to contact the service;

information about a publisher of the service; and a list of other keywords relevant to the service and not described by other fields.

25. The apparatus of claim 16, further comprising:

a query processing component configured to receive a native service query in a second native description language, translate the native service query into a searchable service query according to the normalized schema, receive query results in the normalized schema, translate the query results from the normalized schema to the second native description language to define native query results, and to transmit the native query results.

26. The apparatus of claim 16, wherein the network is a distributed overlay network.

27. The apparatus of claim 16, wherein the network comprises a server configured to provide discovery services.

* * * * *